(12) United States Patent
Palsson

(10) Patent No.: US 11,659,956 B2
(45) Date of Patent: May 30, 2023

(54) CONTROL FOR THE PROCESS OF DRYING WET MATERIAL

(71) Applicant: HEDINN HF., Hafnarfjordur (IS)

(72) Inventor: Gunnar Palsson, Reykjavik (IS)

(73) Assignee: HEDINN HF, Hafnarfjordur (IS)

( * ) Notice: Subject to any disclaimer, the term of this patent is extended or adjusted under 35 U.S.C. 154(b) by 344 days.

(21) Appl. No.: 16/347,109

(22) PCT Filed: Nov. 2, 2017

(86) PCT No.: PCT/IS2017/050013
§ 371 (c)(1),
(2) Date: May 2, 2019

(87) PCT Pub. No.: WO2018/083716
PCT Pub. Date: May 11, 2018

(65) Prior Publication Data
US 2019/0254472 A1    Aug. 22, 2019

(30) Foreign Application Priority Data
Nov. 2, 2016   (IS) .......................................... 050164

(51) Int. Cl.
*A23L 5/20* (2016.01)
*A47J 36/32* (2006.01)
(Continued)

(52) U.S. Cl.
CPC .................. *A47J 36/32* (2013.01); *A23L 5/15* (2016.08); *A23L 5/20* (2016.08); *A47J 27/04* (2013.01);
(Continued)

(58) Field of Classification Search
CPC ...... A47J 2027/043; A47J 27/04; A47J 36/32; A47J 44/00; E05B 77/26; E05B 77/28;
(Continued)

(56) References Cited

U.S. PATENT DOCUMENTS 2,441,813 A * 5/1948 Halvorson ................ C02F 3/30
210/605
4,058,907 A * 11/1977 Lipp ....................... F26B 17/20
34/61

(Continued)

FOREIGN PATENT DOCUMENTS

CN   2039402 U  *  6/1989
FR   2441813 A1     6/1980
(Continued)

OTHER PUBLICATIONS

International Search Report and Written Opinion issued in PCT/IS2017/050013 dated Jan. 16, 2018.
(Continued)

*Primary Examiner* — Drew E Becker
*Assistant Examiner* — Austin Parker Taylor
(74) *Attorney, Agent, or Firm* — Stephen P. Scuderi; Heslin Rothenberg Farley & Mesiti PC

(57) ABSTRACT

The present invention relates to a process for continuous of drying or removing the water phase from wet material, such as organic material and for regulating or controlling the drying mechanisms using heating and drying components in a mechanic set up for drying material. The steam generated in the pre-dryer in the process is sufficient to sustain the energy need of the system as the different components of a meal factory are set up as a closed system.

8 Claims, 5 Drawing Sheets

(51) Int. Cl.

| | |
|---|---|
| *A47J 27/04* | (2006.01) |
| *A47J 44/00* | (2006.01) |
| *F26B 3/20* | (2006.01) |
| *F26B 3/24* | (2006.01) |
| *F26B 17/18* | (2006.01) |
| *F26B 21/10* | (2006.01) |
| *F26B 23/00* | (2006.01) |
| *F26B 25/00* | (2006.01) |
| *A23L 5/10* | (2016.01) |
| *A22C 25/00* | (2006.01) |

(52) U.S. Cl.
CPC ............... *A47J 44/00* (2013.01); *F26B 3/20* (2013.01); *F26B 3/24* (2013.01); *F26B 17/18* (2013.01); *F26B 21/10* (2013.01); *F26B 23/002* (2013.01); *F26B 23/004* (2013.01); *F26B 25/002* (2013.01); *A22C 25/00* (2013.01); *A47J 2027/043* (2013.01); *Y02B 30/52* (2013.01); *Y02P 70/10* (2015.11)

(58) Field of Classification Search
CPC .......... E05B 77/30; E05B 77/32; E05B 81/14; E05B 85/01; F26B 17/18; F26B 21/10; F26B 23/002; F26B 23/004; F26B 25/002; F26B 3/20; F26B 3/24; F26B 2200/16; Y02B 30/52; Y02P 70/10; Y02P 70/405; Y10T 292/1047; Y10T 292/1082; A22C 25/00; A23L 5/15; A23L 5/20; A23B 4/03–033
USPC ............................. 426/233; 34/552, 362, 574
See application file for complete search history.

(56) References Cited

U.S. PATENT DOCUMENTS

| | | | | |
|---|---|---|---|---|
| 4,259,252 | A * | 3/1981 | Perry | C11B 1/12 159/17.1 |
| 4,302,888 | A * | 12/1981 | Boldt | G05D 22/02 165/88 |
| 4,344,976 | A * | 8/1982 | Bladh | A23J 1/04 426/643 |
| 4,345,384 | A * | 8/1982 | Pagnozzi | F26B 23/10 34/76 |
| 4,581,829 | A * | 4/1986 | Becker | F26B 11/16 34/514 |
| 4,788,989 | A * | 12/1988 | Nambu | A24B 3/04 131/303 |
| 5,983,521 | A * | 11/1999 | Thompson | F26B 23/022 34/477 |
| 6,079,122 | A * | 6/2000 | Rajkovich | F26B 25/002 34/574 |
| 2015/0316320 | A1 * | 11/2015 | Maguire | F26B 17/128 34/92 |

FOREIGN PATENT DOCUMENTS

| | | |
|---|---|---|
| WO | 2015170349 A1 | 11/2015 |
| WO | 2015189864 A1 | 12/2015 |

OTHER PUBLICATIONS

Danish Patent and Trademark Office Search Report dated Mar. 10, 2017.

* cited by examiner ization of the water phase from wet material,
CONTROL FOR THE PROCESS OF DRYING WET MATERIAL

CROSS REFERENCE TO RELATED APPLICATIONS

This application is a U.S. National Phase filing under 35 U.S.C. § 371 of International Application PCT/IS2017/050013, filed Nov. 2, 2017, and published as WO 2018/083716 A1 on May 11, 2018. PCT/IS2017/050013 claims priority from Iceland application number 050164, filed Nov. 2, 2016. The entire contents of each of these prior applications are hereby incorporated herein by reference.

FIELD OF INVENTION

The present invention relates to a process for continuous of drying or removing the water phase from wet material, such as organic material. More specifically the present invention relates to a system and a device for regulating or controlling the drying mechanisms using heating and drying components in a mechanic set up for drying material.

INTRODUCTION

Preparation of fish meal from raw material and isolating fish oil from the same is well a known method and the technology currently used have been used for many decades. The process and device involves separation of the oil and removal of water from the raw material initially containing 75% water, 5% oil and 20% of dry matter. In general the raw material is preheated in a pre-cooker and brought to a boiling point in a cooker. The material obtained from the cooker is separated in decanters into three phases of sludge, stick water and an oil phase. The water is then removed from the sludge and stick water phases in evaporators and one or more dryers.

The concern with rising energy costs has driven the industry to look for processes which can re-use some of the energy introduced to into the system for making fish meal from raw material. Some solutions have been provide where heat recovery from the dryer steps and the evaporator plant is obtained, but these are complicated processes which system is often misused, so that the heat recovery devices are not fully utilized.

U.S. Pat. No. 4,344,976 discloses a typical process for recovery of meal of high protein quality and oil from fish, where heating of the fish mass is carried out in any conventional way, and oil is separated from the heated fish mass by means of a centrifuge provided with a separate outlet for separated oil phase. Although it is known to use energy, such as steam, generated within a meal factory to provide energy to heat exchange elements in the factory, the individual components (cookers and dryers) in these prior art system are designed as individual components and have individually heat exchange systems.

WO 2015/170349 discloses a method for operating devices for recovery of meal from organic material in an energy efficient manner, where the individual components of the factory have a common system of heat exchange elements. In this system the heart of the system is a pre-dryer, which is also a steam boiler receiving external energy to heat up the material and generate steam. The steam generated in the pre-dryer can be sufficient to sustain the energy need of the system in combination with a secondary dryer and the cooker. The problem with the process in meal factories as described above is that it is difficult to regulate the heat exchange mechanism for distribution of steam to various components in order to control the operation of the factory, as all the prior art systems bleed part of the steam through their components such as the secondary dryer. Furthermore, the reaction time of changes made is too long, such that if the more energy is needed for the secondary dryer, it takes too much time to get other components in the system to produce and transmit more steam to the heat exchange unit of the secondary dryer. Furthermore, it is difficult to synchronize the need of energy input into the factory and the flow of raw material into that factory and onwards through the factory.

SUMMARY OF THE INVENTION

The present invention provides a new apparatus and method for the control of operating devices for recovery of meal from organic material in an energy efficient manner with automatic regulation of input of energy into the factory and where all the input energy is fully used within the system. In fact it is the utilization of all the input energy which controls the process and the device of the present invention. The heart of the system is a first dryer, which is also a steam boiler which receives external energy to heat up the material and generate steam. Prior art meal factories have not been set up to fully use the energy introduced into them and where steam generated in dryers and evaporators is used to provide energy for heat exchange elements in the same system, bleeding or exiting excess steam in each component has been the solution by using devices such as condensators. The steam generated in the pre-dryer is sufficient to sustain the energy need of the system as the heat exchange units of the different components of the meal factory are set up as a closed system. This means that the steam generated in the pre-dryer/steam boiler does not exit the system, but is used for cooking the material before drying and optionally to heat the surfaces of the secondary dryer as well. In addition to using steam to heat the surfaces of the secondary dryer, the present invention uses dry air which is blown into the secondary dryer while removing the remaining water from the material. The amount of external energy that is provided to the factory is based on the demand for steam from the pre-dryer/steam boiler. By monitoring the content in the cooker and the pre-dryer and by keeping an optimal amount of material in these two components ensures that the factory can be run automatically as long as there is a flow of material into the cooker. It is possible to set the factory up in a manner where a constant, or at least continuous, flow from a pre-dryer to a secondary dryer is the driving force of the factory. This means that material leaving the secondary dryer demands more material from the first dryer and the cooker. This results in more material being feed into the second dryer, which requires more external energy injected into the heat exchange components of the first dryer. The use of sensors and weight cells in the various components aids in this aspect as well as the release of light and heavy gasses from the secondary dryer. The start-up phase of the factory when material is introduced and warmed up and the closing phase when the factory is being emptied are the only phases when manual input is required in opening and closing valves and starting and stopping pumps.

It is an advantage that the apparatus and system of the present invention can be operated such that the pressure in each of the components does not rise above 1 bar. This is obtained by the combination of how the chamber, discs and scrapers are assembled and arranged providing very efficient scraping of all heat exchange surfaces and that the heat exchange elements of the cooker form a closed system with the chamber of the first dryer, such that no steam is allowed to exit system.

It is an advantage of the apparatus, method and system of the present invention that an automated regulation apparatus is provided by regulating the amount of energy, in the form of steam under pressure, introduced into the heat exchange elements of the first dryer. This may be possible due to the following embodiments: a) the heat exchange elements of the cooker form a closed system with the chamber of the first dryer and optionally also a secondary dryer, such that no energy leaves the system as steam, but only condense is evacuated from the heat exchange elements, and b) automatically adjusting the amount of steam under pressure into the jacket of the first dryer to maintain the pressure in the first dryer at a predefined range by monitoring the pressure in the upper portion of the chamber of the first dryer and using a control computer to send feedback signals to the means controlling the in-feed of energy into the first dryer, c) transferring material out of the first dryer and sending feedback signals to the in-feeding mechanism for the cooker based on monitoring the amount of material in the cooker and the first dryer. Thereby, an automated operation of a mal factory is provided as long as there is wet organic material available to be introduced into the factory.

It is an object of the present invention to overcome or ameliorate the aforementioned drawbacks of the prior art and to provide an improved and/or alternative and/or additional device for heating or removing a water phase from material. It is one preferred object of the present invention to provide a device comprising a cooker and a first dryer arranged as a chamber with an upper portion and a semi-cylindrical lower portion heat exchange elements for conducting heat to the chamber and scrapers rotating on a centrally arranged axis between the cylindrical or semi-cylindrical disc-shaped hollow compartments. Moreover, it is a preferred object of the present invention to provide an arrangement the heat exchange elements of the cooker form a closed system with the chamber of the first dryer, such that no steam is allowed to exit system. It is also a preferred object of the present invention to provide a device where a computer controlling the device automatically adjusts the amount energy used to heat the thermal surfaces of the first dryer to maintain the pressure in the first dryer at a predefined range.

The object(s) underlying the present invention is (are) particularly solved by the features defined in the independent claims. The dependent claims relate to preferred embodiments of the present invention. Further additional and/or alternative aspects are discussed below.

Thus, at least one of the preferred objects of the present invention is solved by an apparatus for heating or removing a water phase from material. The apparatus comprises a cooker heating the material and a first dryer for evaporating a portion of the water phase from the material. The cooker and the dryer each comprise i) a chamber having a lower portion with a cylindrical or semi-cylindrical shape and an upper portion for receiving steam from the lower portion, ii) heat exchange elements for conducting heat to the chamber, where the heat exchange elements comprise at least one jacket arranged around the chamber, and a plurality of cylindrical or semi-cylindrical disc-shaped hollow compartments, arranged parallel with space between them in the lower compartment of the chamber, comprising hollow protrusions connecting the disc-shaped hollow compartments to the jacket through connection openings. The cooker and the dryer further comprise iii) an axis arranged centrally within the container, iv) scrapers attached to, and rotating on the centrally arranged axis between the cylindrical or semi-cylindrical disc-shaped hollow compartments. The apparatus further comprises a duct to the jacket of the first dryer for feeding steam under pressure from a steam boiler into the heat exchange elements of the first dryer, a duct from the upper portion of the first dryer to the jacket of the cooker for feeding steam generated in the first dryer into the heat exchange elements of the cooker, sensing means for detecting pressure in the first dryer, and control means for receiving signals from sensing means and to regulate the amount of steam under pressure which is feed into the system. The apparatus is characterized in that the control means sends a feedback signal based on the monitoring of the pressure in the chamber of the first dryer for automatically adjusting the amount of steam under pressure introduced into the jacket of the first dryer to maintain the pressure in the first dryer at a predefined range, and in that the heat exchange elements of the cooker form a closed system with the chamber of the first dryer, such that the steam generated in the first dryer can only leave the closed system as condense.

In the present context the terms "semi-cylindrical disc-shaped hollow compartments" and "discs" refers to the same item, namely the discs that are inserted into the container. The disks are not fully cylindrical as they contain connection members to connect to the jacket and a recess for receiving the axle rotating the scrapers. The discs may also have a relatively flat upper side.

In the present context, the bottom portion of the container is cylindrical so that the scrapers, which are arranged on the rotating axis, can scrape the inner side of the container as well as the discs. The upper portion may have any shape such as, but not limited to oval, cylindrical, square (as shown in the drawings) etc. as long as it does allow room the scrapers to rotate a whole circle around the axis. The upper portion forms an upper chamber to "loft" the stirred material and to collect the vapour or steam as a result of the heat exchange process.

In the present context the terms "heat exchange unit" and "heat exchange elements" refer to a set of disc-shaped hollow compartments and the respective jacket which the set of discs is connected to for a certain portion of a chamber as well as the ducts transporting steam between these components.

In an embodiment of the present invention the apparatus further comprises i) a secondary dryer for removing more of the water phase from the material and ii) transport means for providing a flow of material from the first dryer to the secondary dryer. In such an embodiment a duct from the upper portion of the first dryer also leads to the jacket of the secondary dryer for feeding steam generated in the first dryer into the heat exchange elements of the secondary dryer. Thus, the heat exchange elements of the secondary dryer and the cooker form a closed system with the chamber of the first dryer, such that no steam is allowed to exit system, but where the steam generated in the first dryer can only leave the closed system as condense. The apparatus and the system of the present invention does therefore not bleed steam for any purposes out or into other devices, not for regulating purposes or other, but is fully used within the system. Although a nominal amount of steam exits the jackets of the heat exchange system simultaneously as the gasses are vented from the heat exchange elements of the system, it is only a small fraction of the steam.

In an embodiment of the present invention the apparatus further comprising a pre-cooker to heat up the material before it is transferred into the cooker using condense from the jacket of the cooker and to the jacket of the secondary dryer.

In an embodiment of the present invention a sensor monitors the amount of material in the first dryer and/or cooker by measuring the weight of material or the level of the material in the first dryer and/or cooker.

In an embodiment of the present invention the apparatus further comprises a separation device for separating the oil phase from the material. In such an embodiment a pump is provided for pumping the material to the separation device.

In an embodiment of the present invention the chamber has an inlet in the first dryer for receiving material from the separation device.

In an embodiment of the present invention the apparatus further comprises valves in the top and bottom portion of the jacket of the secondary dryer and/or the jacket of the cooker for releasing light and heavy gasses respectively from the jackets. Furthermore, only a nominal amount of steam exits the jackets simultaneously as the gasses are vented from the heat exchange elements of the system.

In an embodiment of the present invention the apparatus further comprises a duct for providing condense from the secondary dryer and cooker to the pre-cooker.

In an embodiment of the present invention the apparatus further comprises transport means for feeding the cooker with material.

In an embodiment of the present invention the transport means for feeding the cooker with material and the transport means for providing a flow of material from the first dryer to the secondary dryer is a pump or a screw conveyor.

In an embodiment of the present invention the transfer means between the first and secondary dryer is set to keep the flow of material from the first dryer to the secondary dryer constant or continuous.

In an embodiment of the present invention a sensor monitors the amount of material in the first dryer by measuring the height of material in the first dryer.

In an embodiment of the present invention the transfer means between the first and secondary dryer is used to regulate the water content in the secondary dryer by pumping a required amount of material into the secondary dryer to maintain a predefined humidity in the dried material leaving the secondary dryer. In this manner the transfer means between the first and secondary dryer ensures an optimal throughput of the factory.

In an embodiment of the present invention the pressure in the jacket of the first dryer is between 101 and 125° C.

In an embodiment of the present invention the pressure in the temperature of the steam in the upper portion of the first dryer is at or just above 100° C. at a 0-20 mbar pressure.

In an embodiment of the present invention the first dryer has a first jacket and a second jacket parallel arranged around the chamber, and wherein the first jacket receives steam under pressure from a steam boiler. In this embodiment the apparatus further comprises a duct leading from the upper portion of the first dryer into the second jacket of the first dryer, and one or more high pressure fans in the duct between the upper portion of the first dryer and the second jacket of the first dryer for increasing the pressure and the temperature of the steam before injecting it into the second jacket of the first dryer. In the present context such an arrangement with a pressure pump is referred to as an MVR dryer arrangement.

The present invention further provides a method for control of devices for heating or removing a water phase from material using the apparatus of the present invention, the method comprises the steps of:
  feeding material comprising water phase into a cooker 1,
  heating the material in a cooker 1,
  transferring the material from the cooker 1 to a first dryer 2 for evaporating a portion of the water phase from the material,
  feeding steam under pressure from a steam boiler to a heat exchange elements of the first dryer,
  evaporating at least a portion of the water phase from the material in the first dryer thereby generating steam rising to the upper portion of the chamber,
  feeding the steam from the upper portion of the chamber to the jacket arranged around the cooker,
  monitoring the pressure or temperature in the chamber of the first dryer.

The method further comprises the step of a feedback signal, which is sent by a control means to the device providing steam under pressure to the pre-dryer, based on the monitoring of the pressure in the chamber of the first dryer for automatically adjusting the amount of steam under pressure introduced into the jacket of the first dryer to maintain the pressure in the first dryer at a predefined range, and where the heat exchange elements of the cooker form a closed system with the chamber of the first dryer, such that the steam generated in the first dryer can only leave the closed system as condense.

The present invention further provides a system for heating or removing a water phase from material using the apparatus of the invention. The system comprises:
  feeding material comprising water phase into a cooker,
  heating the material in a cooker,
  transferring the material from the cooker to a first dryer for evaporating a portion of the water phase from the material,
  transferring the material from the first dryer,
  feeding steam under pressure from a steam boiler to a heat exchange elements of the first dryer,
  evaporating at least a portion of the water phase from the material in the first dryer thereby generating steam rising to the upper portion of the chamber,
  feeding the steam from the upper portion of the chamber to the jacket arranged around the cooker, and
  automatically adjusting the amount of steam under pressure into the jacket of the first dryer to maintain the pressure in the first dryer at a predefined range.

The system further comprises a control means, which sends a feedback signal to the device providing steam under pressure to the pre-dryer, based on the monitoring of the pressure or temperature in the chamber of the first dryer, for automatically adjusting the amount of steam under pressure introduced into the jacket of the first dryer to maintain the pressure in the first dryer at a predefined range. Furthermore, the heat exchange elements of the cooker form a closed system with the chamber of the first dryer, such that the steam generated in the first dryer can only leave the closed system as condense.

In an embodiment of the present invention the amount of material in the first dryer and cooker is monitored by weight or height in the container.

In an embodiment of the present invention the material is pre-heated in a pre-cooker before transferring the material to the cooker.

In an embodiment of the present invention an oil phase is separated from the material in a separating device after heating the material in the cooker and prior to transferring it into the first dryer.

In an embodiment of the present invention the water condensate from the cooker and optionally the secondary dryer is transported to the pre-cooker to pre-heat the material.

In an embodiment of the present invention light and heavy gasses are released from the secondary dryer 3 through "valves" at the top and bottom portion of the secondary dryer 3 respectively.

In an embodiment of the present invention the scrapers comprise a rotating member and a scraping member, where the scraping member scrapes the surface of the discs as well as the inner surface of the lower portion of the chamber. In a further embodiment of the present invention the scraping member is attached to the rotating member by a pushing member which pushes the scraping member up against the surface of the discs. Such a pushing member is selected from, but not limited to a spring element.

Alternatively or additionally the present invention provides a system for control of the operation of devices for heating or removing a water phase from material to synchronize the energy input and the flow of raw material into the factory, where the system comprises a) feeding material comprising water phase into a cooker, b) heating the material in a cooker, c) transferring the material from the cooker to a first dryer for evaporating a portion of the water phase from the material, and d) transferring the material from the first dryer. The cooker and the first dryer each comprise: i) a chamber having a lower portion with a cylindrical or semi-cylindrical shape and an upper portion for receiving steam from the lower portion, ii) heat exchange elements for conducting heat to the chamber, the heat exchange elements comprising iii) at least one jacket arranged around the chamber, and iv) a plurality of cylindrical or semi-cylindrical disc-shaped hollow compartments, arranged parallel with space between them in the lower compartment of the chamber, comprising hollow protrusions connecting the disc-shaped hollow compartments to the jacket through connection openings. The cooker and the first dryer further comprise: v) an axis arranged centrally within the container, vi) scrapers attached to, and rotating on the centrally arranged axis between the cylindrical or semi-cylindrical disc-shaped hollow compartments, vii) a duct to the jacket of the first dryer for feeding steam under pressure into the heat exchange elements of the first dryer, viii) a duct from the upper portion of the first dryer to the jacket of the cooker for feeding steam generated in the first dryer into the heat exchange elements of the cooker, ix) sensing means for monitoring the pressure in the first dryer, and x) control means for receiving signals from sensing means and to regulate the amount of steam under pressure which is feed into the system. The system further comprises: e) feeding steam under pressure from a steam boiler to a heat exchange elements of the first dryer, f) evaporating at least a portion of the water phase from the material in the first dryer thereby generating steam rising to the upper portion of the chamber, g) feeding the steam from the upper portion of the chamber to the jacket arranged around the cooker, and h) automatically adjusting the amount of steam under pressure into the jacket of the first dryer to maintain the pressure in the first dryer at a predefined range. The control means sends a feedback signal based on the monitoring of the pressure in the chamber of the first dryer for automatically adjusting the amount of steam under pressure introduced into the jacket of the first dryer to maintain the pressure in the first dryer at a predefined range, and wherein the heat exchange elements of the cooker form a closed system with the chamber of the first dryer, such that the steam generated in the first dryer can only leave the closed system as condense.

Alternatively or additionally the present invention provides a method for control of the operation of devices for heating or removing a water phase from material to synchronize the energy input and the flow of raw material into the factory, where the method comprises: a) feeding material comprising water phase into a cooker, b) heating the material in a cooker, c) transferring the material from the cooker to a first dryer for evaporating a portion of the water phase from the material, d) feeding steam under pressure from a steam boiler to a heat exchange elements of the first dryer, e) evaporating at least a portion of the water phase from the material in the first dryer thereby generating steam rising to the upper portion of the chamber, f) feeding the steam from the upper portion of the chamber to the jacket arranged around the cooker, h) monitoring the pressure or temperature in the chamber of the first dryer, i) monitoring the amount of the material in the first dryer and the cooker, and j) transferring the material from the first dryer. A control means regulates the amount of material comprising water phase transferred into the cooker based on the measured weight of the material in the first dryer and the cooker. Furthermore, the control means sends a feedback signal based on the monitoring of the pressure in the chamber of the first dryer for automatically adjusting the amount of steam under pressure introduced into the jacket of the first dryer to maintain the pressure in the first dryer at a predefined range, and the heat exchange elements of the cooker form a closed system with the chamber of the first dryer, such that the steam generated in the first dryer can only leave the closed system as condense.

BRIEF DESCRIPTION OF DRAWINGS

The present invention will be further described with reference to the drawings using reference numbers in the drawings to identify the individual components of the invention.

DETAILED DESCRIPTION OF THE PRESENT INVENTION

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

Figure 1:
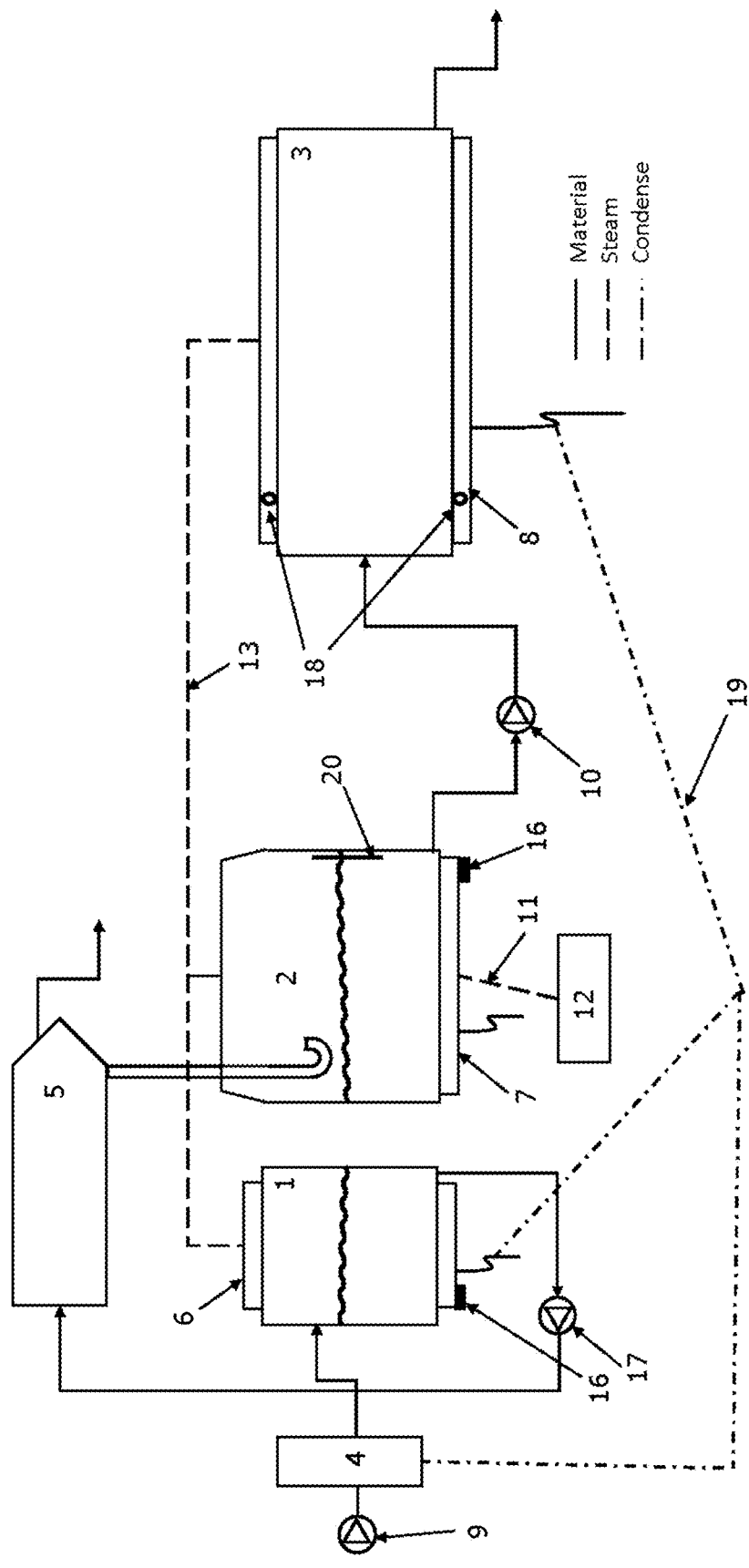
FIG. 1 shows a shows a schematic drawing of system and device of the present invention outlining the route of the material through and the input and distribution of heating media through the system.

FIG. 1 shows a schematic drawing of system for recovery of fish meal and oil from fish raw material, where the route of the material through the system is shown as well as the input and distribution of heating media (steam and condense) through the system. The apparatus shown in this embodiment comprises a cooker 1 heating the material, a first dryer 2 for evaporating a portion of the water phase from the material, and a secondary dryer 3 for removing more of the water phase from the material. Optionally, a pre-cooker 4 can be used to pre-heat the material before it is feed into the cooker. The cooker and the two dryers are chambers having heat exchange elements for conducting heat to the chamber, the heat exchange elements comprising at least one jacket, 6, 7, 8 arranged around the chambers connected to hollow discs (not shown in this drawing) in the chamber. The material is feed to the cooker 1 by means of a pump or a screw conveyor 9. A second pump or a screw conveyor 10 is in piping for feeding material from the first dryer 2 to the secondary dryer 3. The heat exchange system of the device uses steam generated in a steam boiler 12 and feeds steam under pressure from the steam boiler 12 into the jacket of the first dryer 2 via a duct 11. A duct 13 leading from the upper portion of the chamber of the first dryer 2 to the jacket of the cooker 1 and to the jacket of the secondary dryer 3 is used for leading steam generated in the first dryer into the heat exchange elements of the cooker and the secondary dryer 3. The heat exchange elements of the secondary dryer 3 and the cooker 1 form a closed system with the upper chamber of the first dryer 2, such that no steam is allowed to exit system, but only condense. The apparatus may also comprise a separation device 5 for separating the oil phase from the material as shown in this drawing. A pump 17 is used for pumping the material into a separation device 5 for separating the oil phase from the material. After separation of oil from the material, the remaining phase is feed back into the dryer device through an opening and into the first dryer section. Valves 18 arranged at the top and bottom portion of the secondary dryer 3 and cooker 1 (not shown for cooker) are used for releasing light and heavy gasses respectively from the jackets 6 and 8 on the secondary dryer 3 and cooker 1. The apparatus of the invention may also have a duct 19 for providing condense from the jackets 6 and 8 on the secondary dryer 3 and cooker 1 to the pre-cooker 4. The embodiment shown in FIG. 1 also shows a sensor 20 for monitoring the amount of material in the first dryer 2 by measuring the height or level of material in the first dryer 2.

Figure 2:
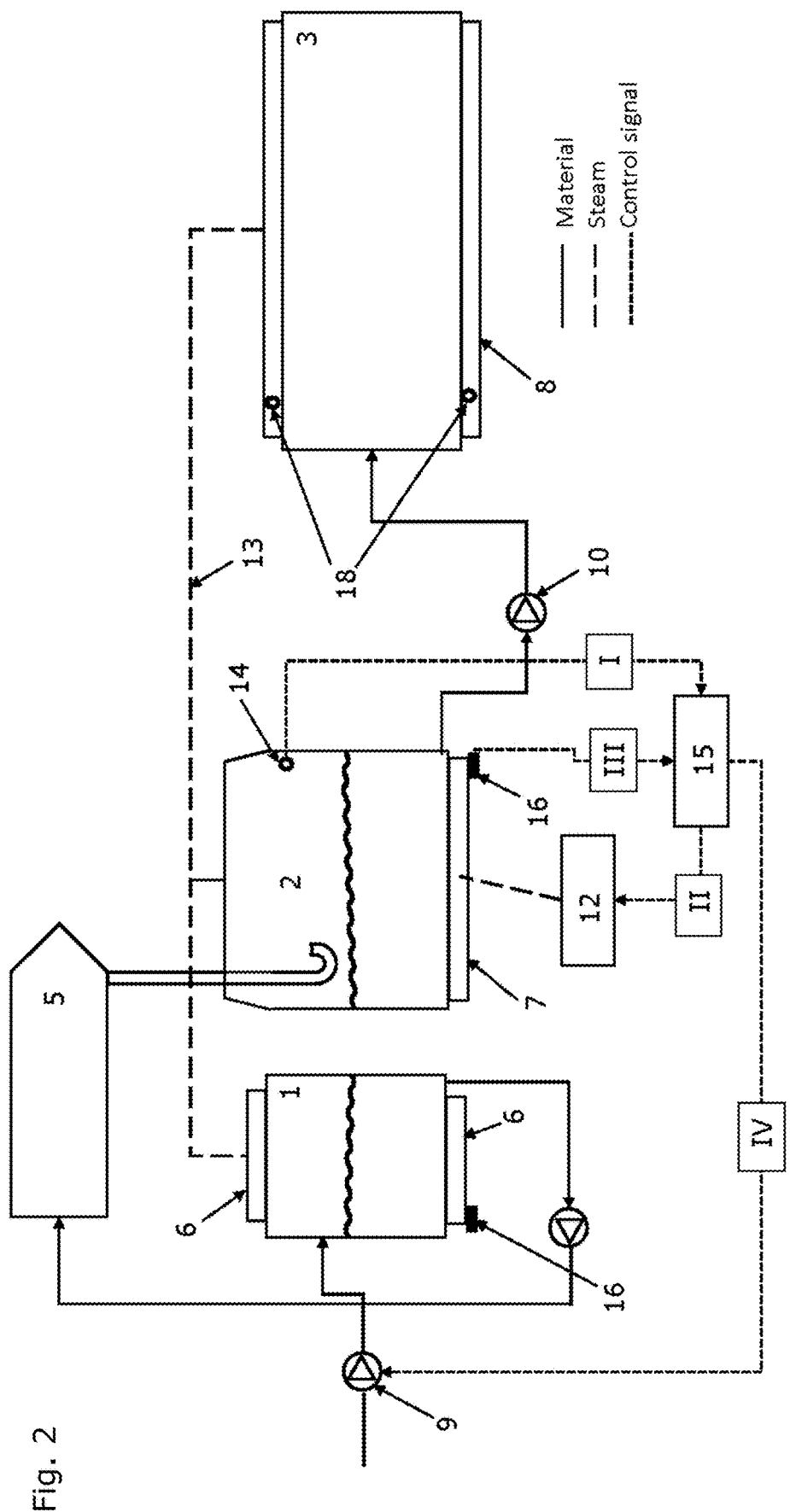
FIG. 2 outlines the control components and signals of the embodiment shown in FIG. 1.

FIG. 2 outlines the control components of the embodiment shown in FIG. 1 for the route of the material through the device of this embodiment. An advantage of the present invention is that the meal factory and the control process presented here provides a system where the factory can run automatically as long as there is material to be feed into the factory. If the factory is temporarily out of raw material, no pre-dried material leaves the first dryer 2 and thereby no energy (as steam under pressure) is introduced into the hear exchange elements of the first dryer. First, the pump 10 is set to pump the material from the first dryer 2 to the secondary dryer 3. A pressure or temperature sensor 14 in the first dryer monitors the pressure or the temperature in the chamber. The pressure sensor 14 is connected to the control computer 15 of the system and a signal (I) from the sensor regulates the input (II) of steam under pressure from a steam boiler 12 into the jacket 7 of the first dryer 2. So if the pressure or temperature drops more steam is injected into the jacket 7 of the first dryer 2, but if the pressure or temperature increases over a set range, the input of steam under pressure/temperature is reduced. Based on pressure measurements in the chamber of the first dryer, ensures that the thermal surfaces in the cooker 1 and secondary dryer 3 are always at about 100° C. The cooker 1 and first dryer 2 are arranged on weight cells 16 in the embodiment shown in FIGS. 1 and 2 for monitoring the amount of material in each chamber. If the amount of material decreases in either the cooker 1 or first dryer 2 as measured by the weight cells, a signal (III) is sent to the control computer 15 of the system, which in return sends a signal (IV) to the pump 9 via and more material is pumped into the factory.

Figure 3:
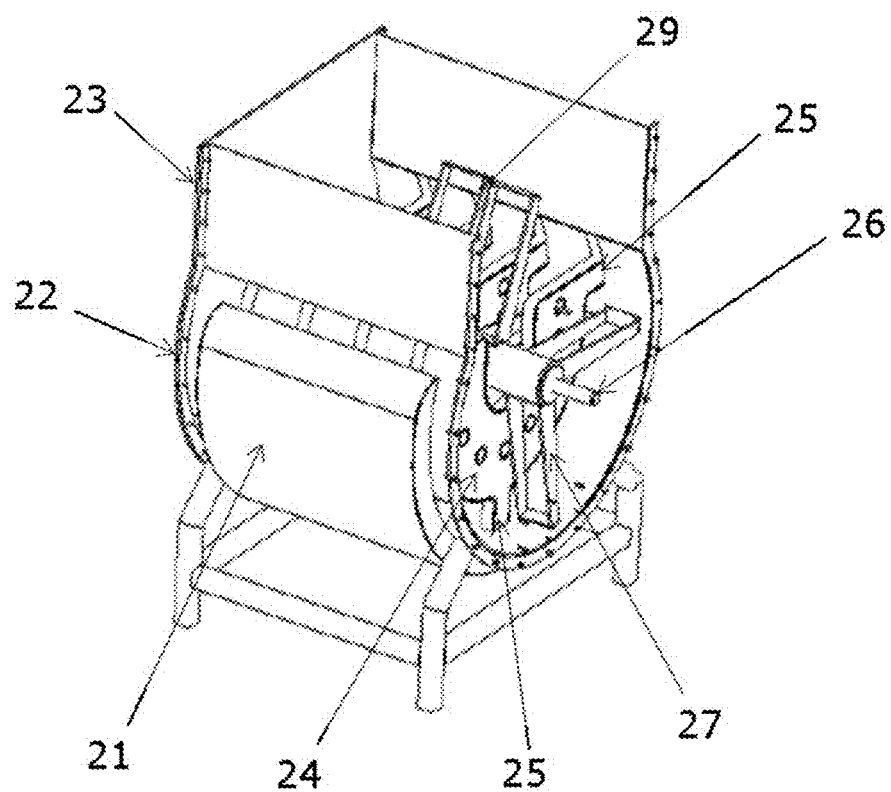
FIG. 3 shows the construction of a cooker, a first dryer or a secondary dryer of the present invention.

FIG. 3 shows the construction of a cooker or a first dryer according to claim 1, where the cooker/dryer has a single jacket 21 arranged around a lower semi-cylindrical chamber 22. The upper portion 23 of the chamber has a rectangular shape and sits on top of the lower semi-cylindrical chamber 22. Disc-shaped hollow compartments 24 are shown parallel arranged with space between them in the lower semi-cylindrical chamber 22, having a connection portion 25 on each side of the upper side of the disc and one at the bottom, where each connection portion 25 connects to the jacket 21 through openings in the lower semi-cylindrical chamber 22. An axis 26 arranged along the chamber rotates the scrapers 27.

Figure 4:
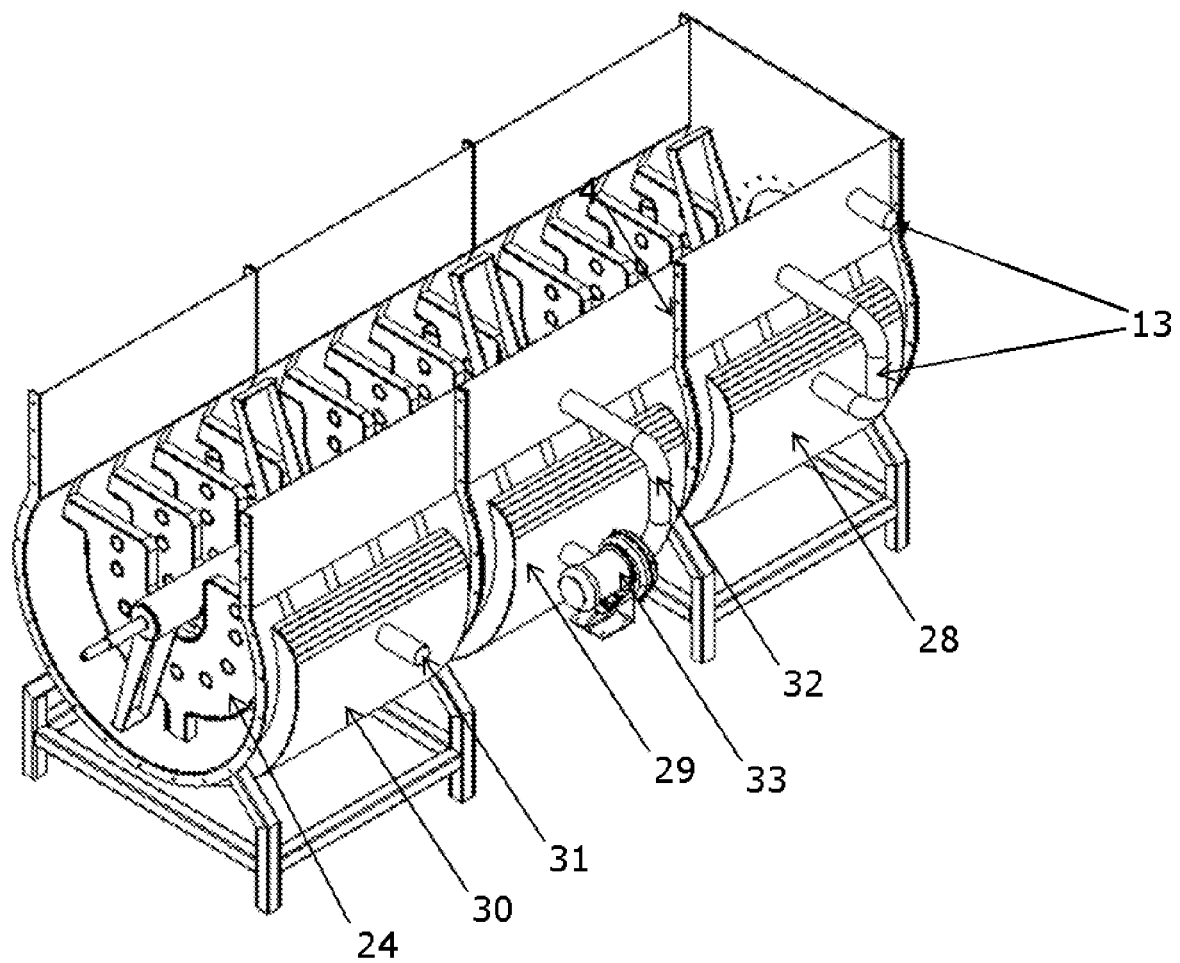
FIG. 4 shows an embodiment according to claims 1 and 18 of the present invention with a combined cooker and dryer device.

FIG. 4 shows an embodiment of a dryer, where the dryer portion of the device has an MVR dryer arrangement. The apparatus shown in FIG. 4 has a dryer chamber in three sections having three jackets arranged around the chamber and a plurality of semi-cylindrical disc-shaped hollow compartments 24, where a set of disc-shaped hollow compartments 24 is connected to their respective jacket 28, 29, 30 to form a heat exchange unit or the heat exchange elements for that portion of the chamber. Therefore, the semi-cylindrical disc-shaped hollow compartments 24 are divided into three sets of disks, where each set provides a heat exchange unit to each section of the dryer. In this embodiment a jacket 28 is arranged around the first dryer section where the material comes in, where steam from the upper portion of the chamber feeds steam to the heat exchange elements/unit of the first dryer section through the duct 13. The second and third dryer sections have two heat exchange units with a first jacket 30 arranged around the chamber at the other end and a second jacket 29 arranged around the middle portion of the chamber as well as their corresponding semi-cylindrical disc-shaped hollow compartments. The jacket 30 arranged around the end of the dryer, where the material leaves the chamber, has an inlet 31 for receiving steam under pressure form a boiler. The second jacket 29 arranged around the middle portion of the dryer is connected to a steam duct 32 leading from the upper portion into the jacket 29 of the middle portion with a high pressure fan 33 arranged in the duct 32 for increasing the pressure and the temperature of the steam taken from the upper portion before injecting it into the respective disc-shaped hollow compartments 24.

Figure 5:
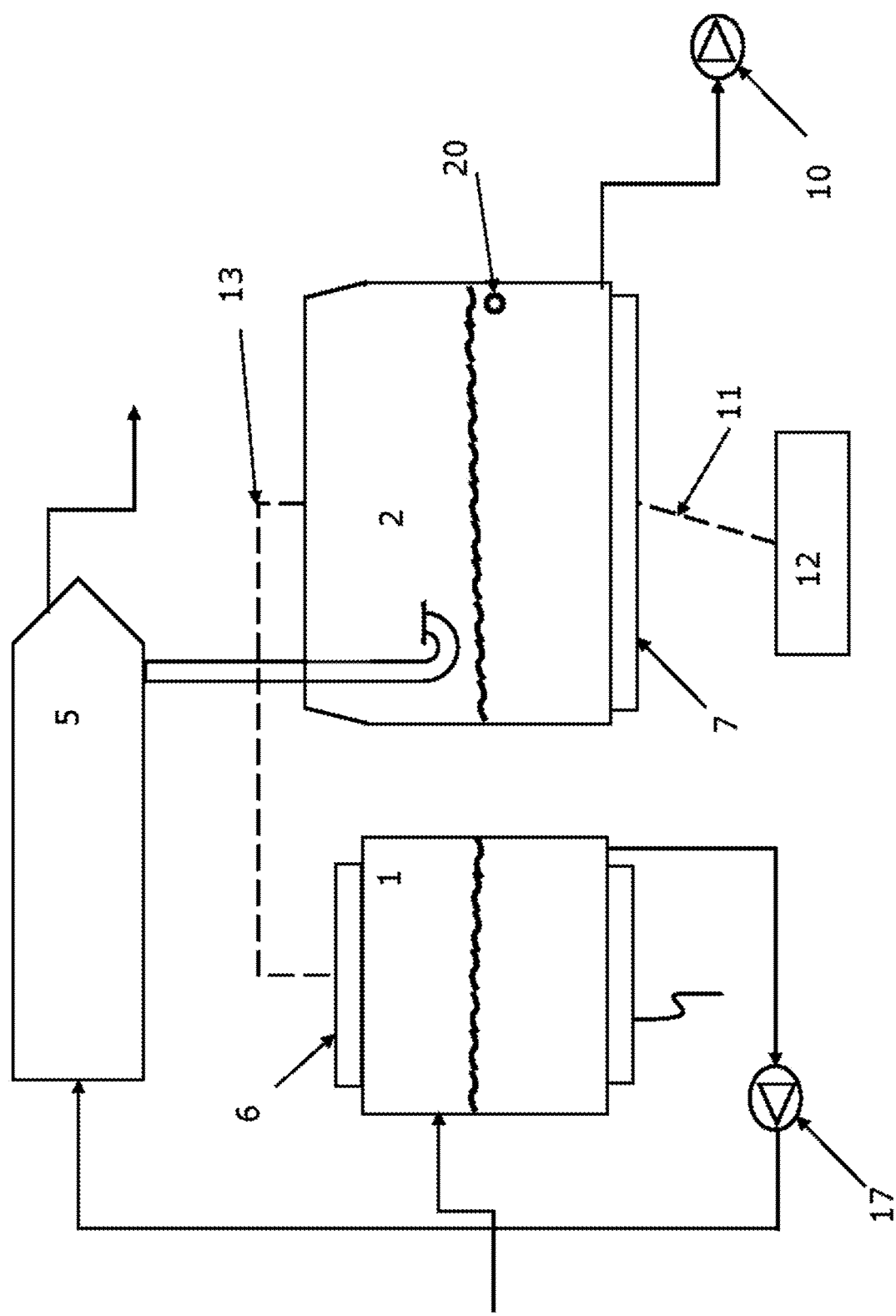
FIG. 5 shows a schematic drawing of system for recovery of fish meal and oil from fish raw material according to claims 1, 13 and 20 of the present invention.

FIG. 5 shows a schematic drawing of system for recovery of fish meal and oil from fish raw material according to claims 1, 13 and 20, where the route of the material through the system is shown as well as the as well as the input and distribution of heating media (steam and condense) through the system. The apparatus shown in this embodiment comprises a cooker 1 heating the material and a first dryer 2 for evaporating a portion of the water phase from the material. The cooker and the first dryer are chambers having heat exchange elements for conducting heat to the chamber, the heat exchange elements comprising at least one jacket, 6, 7 arranged around the chambers connected to hollow discs (not shown in this drawing) in the chamber. A pump or a screw conveyor 10 is in piping for feeding material from the first dryer 2 to the secondary dryer 3. The heat exchange system of the device uses steam generated in a steam boiler 12 and feeds steam under pressure from the steam boiler 12 into the jacket of the first dryer 2 via a duct 11. A duct 13 leading from the upper portion of the chamber of the first dryer 2 to the jacket of the cooker 1 and to the jacket of the secondary dryer 3 is used for leading steam generated in the first dryer into the heat exchange elements of the cooker. The heat exchange elements of the cooker 1 forms a closed system with the upper chamber of the first dryer 2, such that no steam is allowed to exit system, but only condense. The apparatus may also comprise a separation device 5 for separating the oil phase from the material as shown in this drawing. A pump 17 is used for pumping the material into a separation device 5 for separating the oil phase from the material. After separation of oil from the material, the remaining phase is feed back into the dryer device through an opening and into the first dryer section. The embodiment shown in FIG. 1 also shows a level sensor 20 for monitoring the amount of material in the first dryer 2 by measuring the height or level of material in the first dryer 2.

The embodiments and definitions herein all relate to the apparatus, the method and the system of the invention.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A method for control of devices for heating or removing water from fish raw material, the method comprising:
    feeding fish raw material comprising water into a cooker,
    heating the material in the cooker,
    transferring the material from the cooker to a first dryer for evaporating a portion of the water from the material,
    feeding steam under pressure from a steam boiler to heat exchange elements of the first dryer,
    evaporating at least a portion of the water from the material in the first dryer thereby generating steam rising to an upper portion of a chamber of the first dryer,
    feeding the steam from the upper portion of the chamber of the first dryer to a jacket arranged around the cooker,
    monitoring the pressure or temperature in the chamber of the first dryer,
    using sensors for monitoring the amount of material in the first dryer and in the cooker by measuring the weight of material or the level of material in the first dryer and in the cooker, and
    transferring material out of the first dryer,
    wherein a control computer sends a feedback signal based on the monitoring of the pressure or temperature in the chamber of the first dryer for automatically adjusting an amount of steam under pressure introduced into a jacket of the first dryer to maintain the pressure in the first dryer at a predefined range, and
    wherein heat exchange elements of the cooker form a closed system with the chamber of the first dryer, such that the steam generated in the first dryer can only leave the closed system as condensate, and
    wherein the control computer sends feedback signals to the in-feeding mechanism for the cooker based on monitoring the amount of material in the cooker and the first dryer, providing an automated operation of apparatus, wherein the automated operation comprises:
        if feeding of material into the cooker is temporarily stopped, then the feeding of steam from the boiler into the heat exchange elements of the first dryer will stop and the transferring of material out of the first dryer will stop,
        if the pressure or temperature in the first dryer drops, then more steam from the boiler is injected into the heat exchange elements of the first dryer, and
        if the pressure or temperature in the first dryer increases, then less steam from the boiler is injected into the heat exchange elements of the first dryer.

2. The method according to claim 1, wherein the method further comprises:
    transferring the material from the first dryer to a secondary dryer for removing more of the water from the material, and
    feeding the steam from the upper portion of the chamber of the first dryer to a jacket arranged around the secondary dryer.

3. The method according to claim 2, wherein water condensate from the secondary dryer and cooker is transported to a pre-cooker to pre-heat the material.

4. The method of claim 2, wherein the method further comprises:

providing the steam under pressure from the steam boiler as a sole source of external energy, feeding the steam from the steam boiler to only the heat exchange elements of the first dryer to heat up the material and generate steam in the chamber of the first dryer, and providing the steam generated in the chamber of the first dryer to both the jacket arranged around the cooker and the jacket arranged around the secondary dryer as the only source of heat energy for both the cooker and the secondary dryer respectively.

5. The method according to claim 1, wherein the method further comprises keeping the pressure in the first dryer constant.

6. The method according to claim 1, wherein an oil is separated from the material in a separating device after heating the material in the cooker and prior to transferring the material into the first dryer.

7. A method for heating or removing water from fish raw material, the method comprising:
feeding fish raw material comprising water into a cooker,
heating the material in the cooker,
transferring the material from the cooker to a first dryer for evaporating a portion of the water from the material,
transferring the material from the first dryer
wherein the cooker and the first dryer each comprise:
  a chamber having a lower portion with a cylindrical or semi- cylindrical shape and an upper portion for receiving steam from the lower portion,
  heat exchange elements for conducting heat to the chamber, the heat exchange elements comprising
  at least one jacket arranged around the chamber,
  a plurality of cylindrical or semi-cylindrical disc-shaped hollow compartments, arranged parallel with space between them in the lower portion of the chamber, and
  hollow protrusions connecting the disc-shaped hollow compartments to the jacket through connection openings,
an axis arranged centrally within the container, and
scrapers attached to, and rotating on the centrally arranged axis between the cylindrical or semi-cylindrical disc-shaped hollow compartments,
a duct to the jacket of the first dryer for feeding steam under pressure into the heat exchange elements of the first dryer,
a duct from the upper portion of the first dryer to the jacket of the cooker for feeding steam generated in the first dryer into the heat exchange elements of the cooker,
a sensor for monitoring the pressure or temperature in the chamber of the first dryer, and
a control computer for receiving signals from the sensor and to regulate the amount of steam under pressure which is feed into the system,
feeding steam under pressure from a steam boiler to heat exchange elements of the first dryer, evaporating at least a portion of the water from the material in the first dryer thereby generating steam rising to the upper portion of the chamber,
feeding the steam from the upper portion of the chamber to the jacket arranged around the cooker,
monitoring the pressure or temperature in the chamber of the first dryer,
using sensors for monitoring the amount of material in the first dryer and in the cooker by measuring the weight of material or the level of material in the first dryer and in the cooker, and
wherein the control computer sends a feedback signal based on the monitoring of the pressure or temperature in the chamber of the first dryer for automatically adjusting the amount of steam under pressure introduced into the jacket of the first dryer to maintain the pressure in the first dryer at a predefined range, and
wherein the heat exchange elements of the cooker form a closed system with the chamber of the first dryer, such that the steam generated in the first dryer can only leave the closed system as condensate, and
wherein the control computer sends feedback signals to the in-feeding mechanism for the cooker based on monitoring the amount of material in the cooker and the first dryer, providing an automated operation of apparatus as long as there in wet organic material available to be introduced into the apparatus, wherein the automated operation comprises:
  if feeding of material into the cooker is temporarily stopped, then the feeding of steam from the boiler into the heat exchange elements of the first dryer will stop and the transferring of material out of the first dryer will stop,
  if the pressure or temperature in the first dryer drops, then more steam from the boiler is injected into the heat exchange elements of the first dryer, and
  if the pressure or temperature in the first dryer increases, then less steam from the boiler is injected into the heat exchange elements of the first dryer.

8. The method of claim 7, wherein the method further comprises:
transferring the material from the first dryer to a secondary dryer for removing more of the water from the material,
feeding the steam from the upper portion of the chamber of the first dryer to a jacket arranged around the secondary dryer,
providing the steam under pressure from the steam boiler as a sole source of external energy,
feeding the steam from the steam boiler to only the heat exchange elements of the first dryer to heat up the material and generate steam in the chamber of the first dryer, and
providing the steam generated in the chamber of the first dryer to both the jacket arranged around the cooker and the jacket arranged around the secondary dryer as the only source of heat energy for both the cooker and the secondary dryer respectively.

* * * * *

UNITED STATES PATENT AND TRADEMARK OFFICE
CERTIFICATE OF CORRECTION

PATENT NO. : 11,659,956 B2
APPLICATION NO. : 16/347109
DATED : May 30, 2023
INVENTOR(S) : Gunnar Palsson It is certified that error appears in the above-identified patent and that said Letters Patent is hereby corrected as shown below:

In the Claims

Column 12, Line 43: Claim 1, Delete "operation of apparatus, wherein the" and insert -- operation of apparatus as long as there is wet organic material available to be introduced into the apparatus, wherein the --

Signed and Sealed this
Eighteenth Day of July, 2023

Katherine Kelly Vidal
*Director of the United States Patent and Trademark Office*